US008843904B2

(12) United States Patent
Andrade et al.

(10) Patent No.: US 8,843,904 B2
(45) Date of Patent: Sep. 23, 2014

(54) AUTOMATED BUILDING AND RETARGETING OF ARCHITECTURE-DEPENDENT ASSETS

(75) Inventors: Henrique Andrade, Croton-on-Hudson, NY (US); Judah M. Diament, Bergenfield, NJ (US); Bugra Gedik, White Plains, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/693,554

(22) Filed: Jan. 26, 2010

(65) Prior Publication Data

US 2011/0185346 A1 Jul. 28, 2011

(51) Int. Cl.
*G06F 9/45* (2006.01)
*G06F 9/445* (2006.01)

(52) U.S. Cl.
CPC ..................................... *G06F 8/60* (2013.01)
USPC ............................ 717/136; 717/140; 717/151

(58) Field of Classification Search
None
See application file for complete search history.

(56) References Cited

U.S. PATENT DOCUMENTS

| | | | |
|---|---|---|---|
| 6,820,255 B2 * | 11/2004 | Babaian et al. | 717/136 |
| 6,865,735 B1 * | 3/2005 | Sirer et al. | 717/158 |
| 7,171,659 B2 | 1/2007 | Becker et al. | |
| 7,337,436 B2 * | 2/2008 | Chu et al. | 717/140 |
| 7,409,463 B2 | 8/2008 | Ramachandran | |
| 7,434,213 B1 * | 10/2008 | Prakash et al. | 717/152 |
| 7,735,080 B2 * | 6/2010 | Barturen et al. | 717/177 |
| 7,895,572 B2 * | 2/2011 | Stienhans | 717/120 |
| 8,136,100 B1 * | 3/2012 | Goldman | 717/136 |
| 2003/0046681 A1 * | 3/2003 | Barturen et al. | 717/177 |
| 2004/0068715 A1 * | 4/2004 | Wong et al. | 717/136 |
| 2005/0010891 A1 * | 1/2005 | Chaiken et al. | 717/100 |
| 2005/0108690 A1 * | 5/2005 | Lau et al. | 717/136 |
| 2005/0138606 A1 * | 6/2005 | Basu et al. | 717/136 |
| 2006/0206880 A1 * | 9/2006 | Barraclough et al. | 717/140 |
| 2007/0028208 A1 * | 2/2007 | Maki | 717/106 |
| 2007/0038983 A1 * | 2/2007 | Stienhans | 717/127 |
| 2007/0106983 A1 * | 5/2007 | Owen et al. | 717/136 |
| 2007/0169046 A1 * | 7/2007 | Gordy et al. | 717/151 |
| 2007/0234316 A1 * | 10/2007 | Bayerlein | 717/140 |
| 2009/0007091 A1 | 1/2009 | Appiah et al. | |
| 2009/0094586 A1 * | 4/2009 | Brown et al. | 717/136 |
| 2010/0058302 A1 * | 3/2010 | Broscaru et al. | 717/151 |

OTHER PUBLICATIONS

Scott et al.Retargetable and Reconfigurable Software Dynamic Translation. Proceedings of the international symposium on Code generation and optimization: feedback-directed and runtime optimization, 2003, pp. 36-47, Retrieved on [May 12, 2014] Retrieved from the Internet: URL<http://dl.acm.org/citation.cfm?id=776265>.*
Baldassin et al. Automatic Retargeting of Binary Utilities for Embedded Code Generation. IEEE Computer Society Annual Symposium on VLSI, Mar. 2007, pp. 253-258. Retrieved on [May 12, 2014] Retrieved from the Internet: URL<.*
"SPADE: The System S Declarative Stream Processing Engine," Gedik et al., SIGMOD '08, Jun. 9-12, 2008, pp. 1123-1134.

* cited by examiner

*Primary Examiner* — Thuy Dao
*Assistant Examiner* — Cheneca Smith
(74) *Attorney, Agent, or Firm* — Preston J. Young, Esq.; Blanche E. Schiller, Esq.; Heslin Rothenberg Farley & Mesiti P.C.

(57) ABSTRACT

Architecture-dependent assets are automatically built and retargeted. An asset originally built for one architecture is downloaded and automatically retargeted on another architecture. This automatically retargeting may be performed on demand, at runtime.

24 Claims, 7 Drawing Sheets

AUTOMATED BUILDING AND RETARGETING OF ARCHITECTURE-DEPENDENT ASSETS

This invention was made with Government support under Contract No. H98230-07-C-0383 awarded by Department of Defense DOD. The Government has certain rights in this invention.

BACKGROUND

This invention relates, in general, to processing within a computing environment, and in particular, to facilitating the building and/or retargeting of architecture-dependent assets.

An asset is a building block of an application or it can be an application, itself. An asset may have dependencies on other assets, such as libraries, components, data, resources, etc. The building of an asset includes transforming the source code of the asset, which represents the logic of the asset, from a computer language into a binary executable form. An asset may be built for a particular architecture. For instance, it may be built for a specific hardware architecture and/or for specific software (e.g., operating system, versions of software libraries, etc.). When an asset is built for a particular architecture, it is an architecture-dependent asset.

An architecture-dependent asset can run on the architecture for which it was built, but not on a different architecture. Further, if the asset has dependencies, the dependencies may also need to be built for that architecture.

Often, assets are to be used by multiple users and applications. This is the backbone of component-based technologies. However, in order for an architecture-dependent asset to be executed on other architectures, it and its dependencies need to be retargeted for those other architectures. The retargeting includes building the asset on the other architectures, if necessary. The building and retargeting of assets are tedious manual processes.

BRIEF SUMMARY

Since the build and retarget processes currently require manual intervention, they are time-consuming and error prone. Non-expert developers often do not have the ability to successfully complete both. The difficulty of the build and retarget processes raises a significant barrier to reusing assets across different runtime environments.

To facilitate the reuse of assets on multiple target environments, a capability is provided to automate the build and retarget processes. This saves time and reduces errors.

The shortcomings of the prior art are overcome and additional advantages are provided through the provision of a method of facilitating processing within a computing environment. The method includes, for instance, obtaining, by a processor, an asset built for a first architecture; and automatically retargeting, by the processor, the asset for a second architecture, wherein the first architecture is different from the second architecture.

Systems and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for automatically building and retargeting architecture-dependent assets. As stated above, an asset is a building block of an application or an application, itself. An asset is an architecture-dependent asset, if the asset was built for a specific architecture. As used herein, an architecture includes hardware and software configurations, such as, for instance, a particular hardware architecture, a particular hardware architecture level, a particular operating system, a particular operating system version and/or particular versions of software libraries, as examples. When an asset is an architecture-dependent asset, it can run on the architecture for which it was built, but not for different architectures without being retargeted for those different architectures.

Retargeting includes, as examples, downloading a binary configuration for the asset corresponding to the architecture on which it is to run, and if no such configuration exists, then building that configuration. The retargeting, including the rebuilding, is performed automatically, without human intervention, in one example.

To facilitate using an architecture-dependent asset on a different architecture, build time and runtime tools, as well as workflows, are provided to automatically retarget the asset from a machine having the one architecture to another machine having a different architecture. This allows architecture-dependent assets to be easily reused.

Although characteristics of an architecture are provided as examples herein (e.g., a particular hardware architecture, a particular hardware architecture level, a particular operating system, a particular operating system version, particular versions of software libraries), other characteristics may be defined. If an asset is built on one machine and cannot run on another machine without being rebuilt, then it is said that the one machine has an architecture different from the another machine.

An asset can be of many different types, including, for instance:

1) A component, which is a self-contained portion of computation that carries out domain-specific processing. A component can be, for example, a web service that generates a random number or a stream processing operator that computes the aggregation of tuples arriving to within certain time windows;
2) A component toolkit, which is a collection of components that are logically related; for example, considering a data processing domain, such as signal processing or data mining;
3) An application, which is a top-level construct that employs other assets, such as components, libraries, data files, and/or external computational resources, with the aim of processing data and producing results. For example, the services provided by an e-business web store can be delivered by an application. Similarly, a stream processing task, such as inspecting data from the stock exchange with the aim of spotting trading bargains, can be implemented by a stream processing application;
(4) A library, which is a collection of classes and functions providing a set of services to external users. Libraries are implemented using languages, such as Java or C++, and are properly packaged for use in binary form as static or dynamic artifacts that an application can be linked against;
(5) A data file, which is a storage artifact where information (e.g., bootstrapping information, images, text, data sets, etc.) for an application can be kept; and
(6) A computational resource, which is loosely defined as an external entity to an application that provides a certain service. For example, a web server, a device driver, or a database server that forms a computational ecosystem with an application.

Other examples are also possible.

Figure 1A:
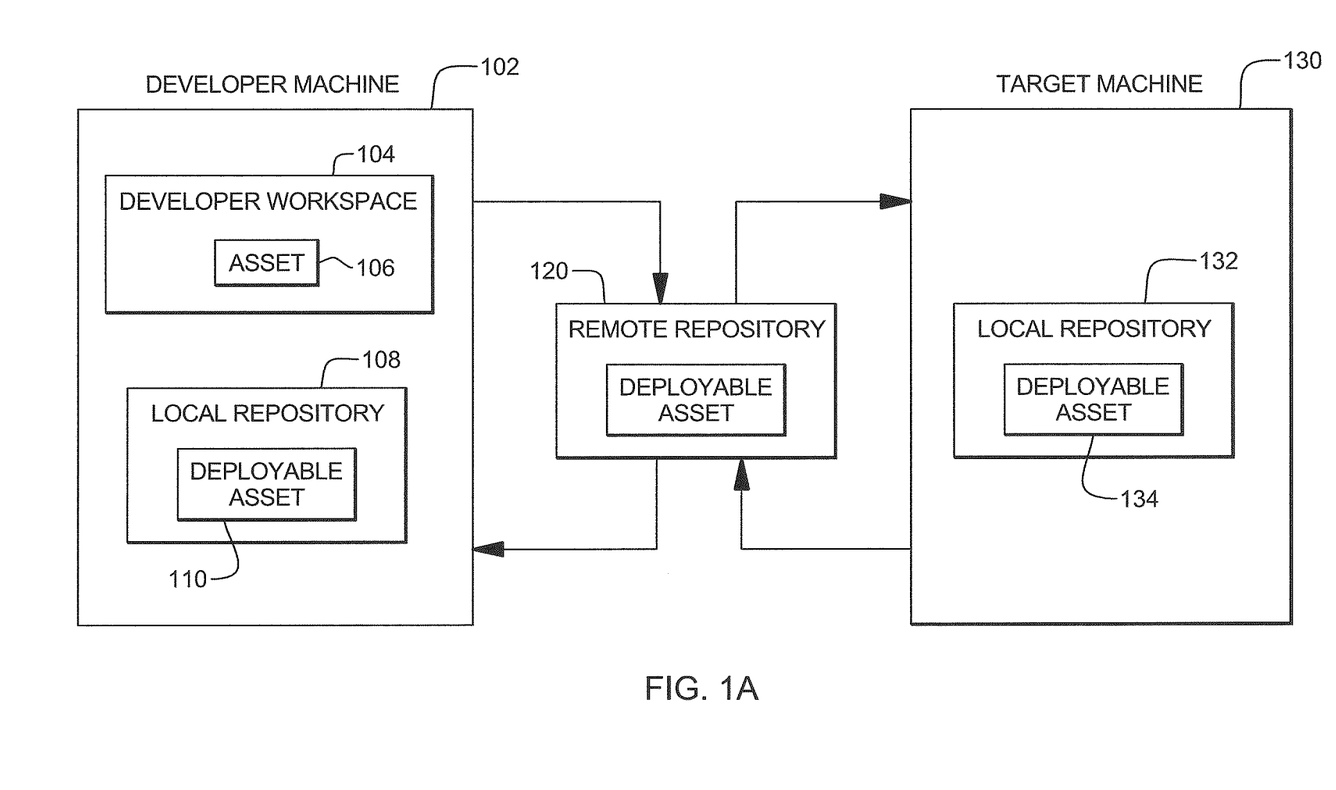
FIG. 1A depicts one example of a computing environment to incorporate and use one or more aspects of the present invention.

Referring to FIG. 1A, in one example, a developer creates one or more assets on a developer machine 102. The developer machine includes a developer workspace 104, which is an area in persistent memory of the developer's machine, in which the developer creates and stores one or more assets 106. Each created asset is then built for the particular architecture of the developer machine (e.g., the particular hardware architecture or particular level of hardware architecture, the particular operating system or particular version of operating system, and/or particular versions of software libraries), and that built asset, is stored in a local repository 108, as a deployable asset 110.

The deployable asset may be uploaded to a remote repository 120, so that it may be shared with other users. In one example, a user on a target machine 130 may wish to download the deployable asset and deploy it on its machine. If the target machine is of a different architecture (e.g., different hardware architecture, different level of hardware architecture, different operating system, different version of operating system, and/or different versions of software libraries, as examples) than the developer machine, the deployable asset is automatically retargeted, in accordance with an aspect of the present invention, for the target machine, and stored in its local repository 132, as a retargeted deployable asset 134.

Figure 1B:
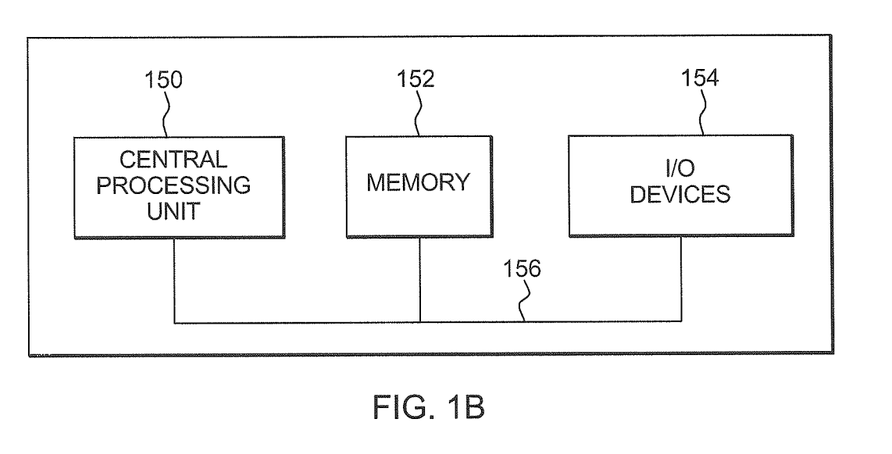
FIG. 1B depicts one example of various components of a machine of FIG. 1A, in accordance with an aspect of the present invention.

In one example, each machine is, for instance, a computing node that includes, for instance, one or more central processing units 150 (FIG. 1B), a memory 152, and one or more I/O devices 154 coupled to one another via one or more buses 156. Each machine is of a particular architecture having, for instance, a specific hardware architecture (e.g., System p®, System x®, System z®, offered by International Business Machines Corporation), and may have an operating system, such as z/OS®, offered by International Business Machines Corporation, or other operating system executing thereon. System p®, System x®, System z®, and z/OS® are registered trademarks of International Business Machines Corporation, Armonk, N.Y. Other names used herein may be registered trademarks, trademarks or product names of International Business Machines Corporation or other companies.

If the developer machine has a different architecture than the target machine, such that assets built on the developer machine will not run on the target machine without being re-built or retargeted, then when the asset is to be deployed on the target machine, a technique is used to automatically build and retarget the asset.

Figure 2:
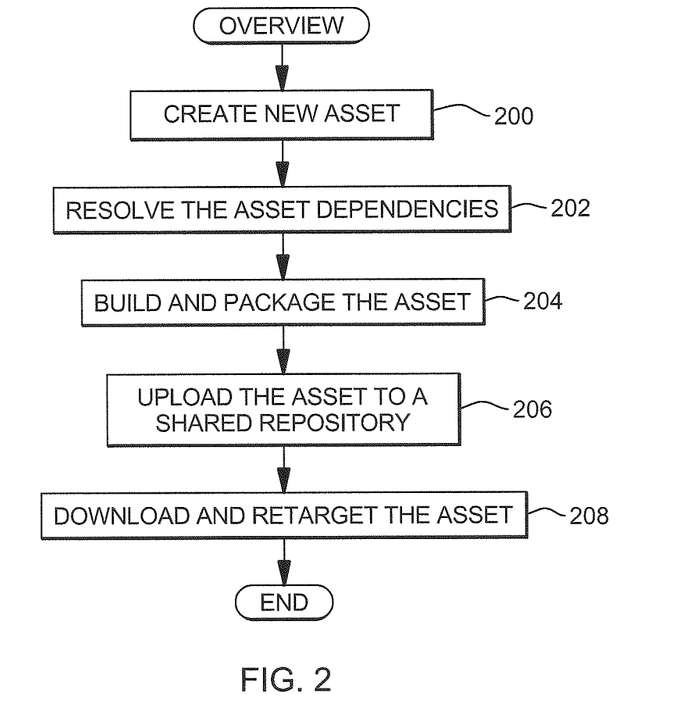
FIG. 2 depicts one embodiment of an overview of the logic used to automatically build and retarget an asset, in accordance with an aspect of the present invention.

One embodiment of an overview of the logic to automatically build and retarget an asset, in accordance with an aspect of the present invention, is described with reference to FIG. 2. A developer creates a new asset on the developer's machine, STEP 200, resolves the asset to determine if all the dependencies of the asset are available, STEP 202, and builds and packages the asset for the developer's machine, STEP 204. The asset is then uploaded to a shared repository to be reused by other users, STEP 206. Thereafter, a user (e.g., a person or an automated process) on a different machine can download, and if needed, retarget the asset so it can run on the different machine, STEP 208.

Figure 3:
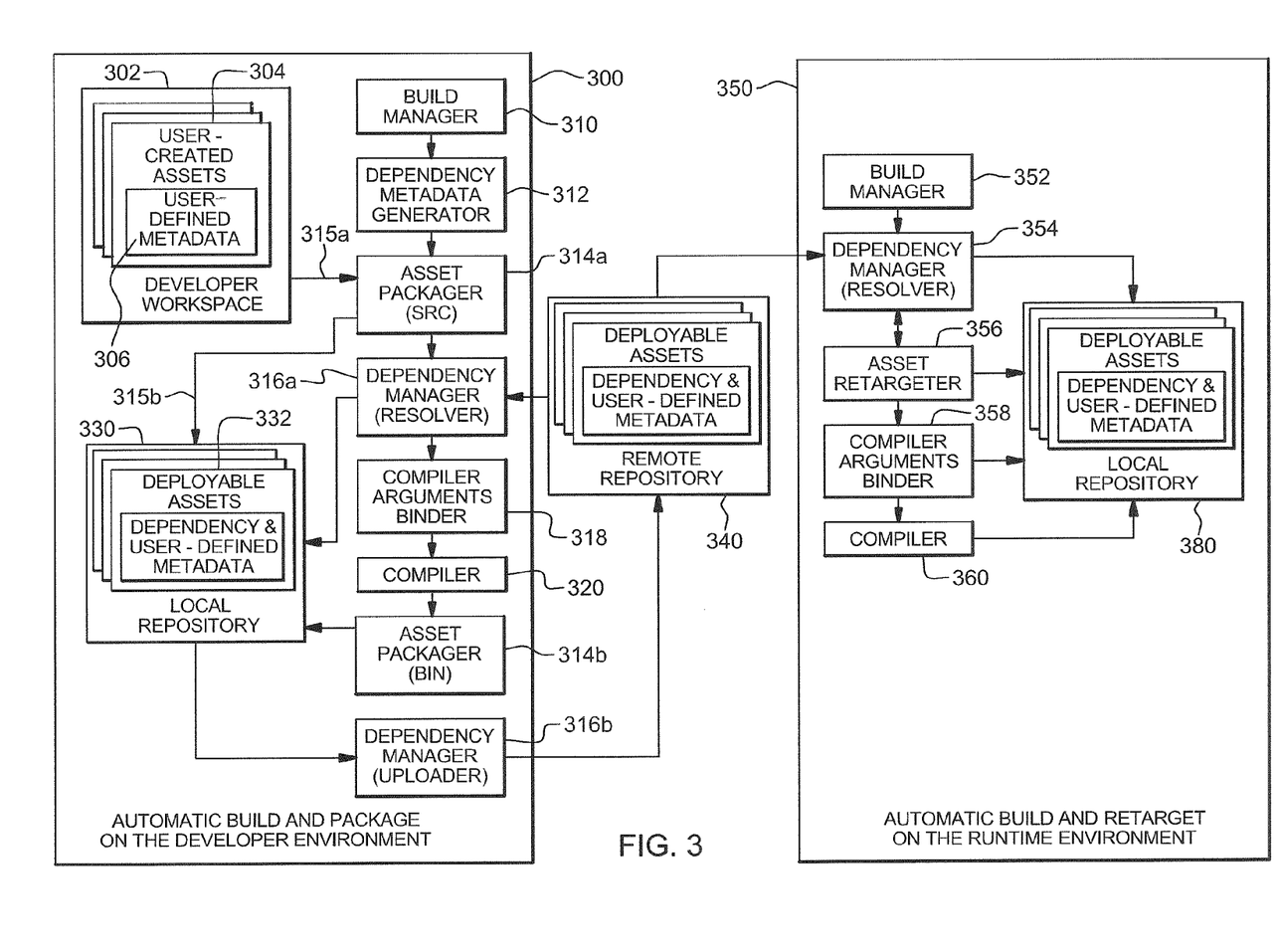
FIG. 3 depicts examples of a developer environment and a runtime environment enabled to automatically build and retarget an asset, in accordance with an aspect of the present invention.

Further details regarding the automatic building and retargeting of an asset are described herein and further with reference to FIG. 3. As stated, initially, a developer creates a new asset on the developer's own machine, and wishes to resolve and build that asset. The developer authors metadata declaring other assets, if any, on which the asset depends. Some of the assets on which the asset depends may already be on the developer's machine, while others may be located in remote repositories. To facilitate the resolve and build, one or more processes are invoked to automatically perform the following:

1. Cross-compile the user-defined metadata into metadata consumable by a dependency manager. For instance, metadata created by the developer as value pairs and placed in a property file, is automatically transformed into an XML file (or other representation) usable by a dependency manager in resolving the asset. For instance, the user-defined metadata is coded in XML format.

Eventually, each asset is built with a source configuration (src) containing the source code of the asset, as well as an architecture-specific configuration (bin) containing the binaries for the architecture on which the asset was built. When the asset is built for the specific architecture, the metadata includes information about the architecture on which the asset was built and packaged, to facilitate automatic retargeting, as described below.

2. Recursively look on the developer's machine for any of the dependencies starting with those declared in the user-defined metadata and generating and/or cross-compiling metadata consumable by a dependency manager for each found asset.
3. Configure and invoke the dependency manager to discover and retrieve the required assets, be they on the developer's machine or in a remote repository. The dependency manager recursively discovers and retrieves all assets in the user-created asset's dependency graph.
4. For any assets, such as C++ libraries, that have template compiler options/parameters, the options/parameters are bound to the architecture onto which they are being downloaded, so that these assets are ready to be built.
5. If all assets required by the new user-created asset were successfully fetched, a compiler is invoked to build the user-created asset, such that it can be tested by the developer, and then packaged in an archive (such as Java Archive (JAR), ZIP, etc.), such that it is ready to be shared with others.

Referring to FIG. 3, in one example, there is a developer environment 300, as well as a runtime environment 350. It is assumed for this example that the developer environment is of a different architecture than the runtime environment. Within the developer environment, there is a developer workspace 302, in which the developer creates and stores one or more assets 304.

The user created assets are comprised of the source artifacts that make up the asset, as well as user-defined metadata 306. In one example, they are contained within a single directory graph in the developer's workspace; and the user-defined metadata is located in the root of the graph, in a file, such as a file called "asset.properties." The metadata has the following characteristics, as examples:

a. name, namespace, and version—the unique ID of the asset.
b. asset.type—app |lib|toolkit.
c. tags—human readable tags to facilitate search in a repository.
d. description—a human-readable description of the asset.
e. toolkits—a comma-separated list of the directories of toolkits that the asset depends on, if any, where a toolkit is specified using the same syntax as in pkg-config: toolkitName[=||<||<=||>||>=]version (pkg-config is offered as an open source tool).
f. libs—a comma-separated list of the libraries which this asset directly depends on, if any, where a library is specified using the same syntax as in pkg-config: libraryName[=||<||<=||>||>=]version.
g. remote.host—absolute URL (Universal Resource Locator) of a remote repository to be used when resolving this asset.
h. remote.user, remote.password—credentials to use when logging in to remote.host.

Additional, fewer and/or different characteristics may be used in other embodiments.

Continuing with reference to FIG. 3, in one example, a developer employs a build manager 310 (e.g., the Unix Make utility), which allows the developer to specify the particular steps to be taken to transform an asset from source to executable. The build manager is used to automatically invoke each of the specified steps to accomplish the task. In accordance with an aspect of the present invention, the developer does not have to manually provide the build manager with much of the information needed for the build process. Instead, the information is automatically provided. For instance, previously, a developer had to spell out for the build manager which assets to build and where to find their files, compiler arguments, etc. However, in accordance with an aspect of the present invention, this information is automatically provided. When the asset is being resolved, the resolver creates a record of all the assets in the dependency graph that were found. That record of resolved assets is used to: obtain the list of libraries that were resolved, so the compiler arguments binder can be invoked on them; and write out to a file a list of locations of the pkg-config files for all the libraries that were resolved, and a list of toolkit directories where all the toolkits for this application can be found. The build manager can then build the asset using that list combined with the information in the pkg-config files. This saves the developer the work of manually providing that information to the build manager.

The definition of the created asset, along with the user-defined metadata for that asset, is provided to a dependency metadata generator 312. Generator 312 creates the provisioning metadata of the asset, as well as recursively creates the provisioning metadata of the dependencies of the asset that are present in the developer workspace, as further described below. The provisioning metadata is that metadata used to deploy the asset on one or more computing nodes.

The asset is then packaged using an asset packager 314a. The asset packager packages the source artifacts of the asset found on the developer workspace (indicated by arrow 315a) into an archive, such as, for instance, Java Archive (JAR) or ZIP files. These packaged assets in a source (src) configuration are stored in a local repository 330 (see arrow 315b). The local repository can be, for instance, an area of persistent memory on the developer's machine, a webserver, a source control system, a location on the file system, etc.

If dependency assets are needed that are not on the local machine, a dependency manager 316a is used to resolve and download the asset dependencies. In one example, it calls IVY (offered by the Apache Foundation) to perform the resolve. Other examples of tools used to manage dependencies, include, OSGI from the OSGI Alliance; and RPM and pkg-config, which are open source projects available under the GPL license.

Then, if the asset or one of its dependencies needs to be compiled, a compiler arguments binder 318 is used to prepare the compiler arguments for the compiler. For instance, it translates a template definition of the compiler arguments into absolute paths usable by the compiler. Further, it also generates a list of bound assets, such that the compiler can build them without requiring the developer to specify the build process. An example is provided below.

In one example, the paths for the compiler are defined relative to the prefix. In the template version, the prefix is a variable. In the bound version, the prefix points to the location on the file system where the library actually is, so the compiler can now find what it needs. For instance:

Templated Version of the File (.pc.tmpl extension):
prefix=@prefix@
Name: state-tax-calculator
Description: A library which calculates state taxes
Version: 2.1
Cflags: -isystem$ {prefix}
Libs: -1CalculateStateTax-L$ {prefix}-W1,-rpath,$ {prefix}
Bound Version of the File (.pc extension):
prefix=/homes/hny4/djudah/streamsWork/provtool/settings/local_repository/libs/state-tax-calculator/2.1
Name: state-tax-calculator
Description: A library which calculates state taxes
Version: 2.1
Cflags: -isystem$ {prefix}
Libs: -1CalculateStateTax-L$ {prefix}-W1,-rpath,$ {prefix}

Thereafter, a compiler 320 is used to transform the source artifacts to executable artifacts, and asset packager 314b packages the asset's binary artifacts into the archive (e.g., JAR or ZIP files). These packaged assets in binary (bin) configuration are stored in local repository 330, as deployable assets (bin) 332.

In one example, deployable assets have the following attributes:

a. A deployable asset is an asset in a state that its provisioning metadata has been defined and any source and binaries have been packaged, and it is ready to be deployed and/or retargeted.

b. A deployable asset is comprised of a provisioning metadata file and multiple configuration files e.g., JAR files, which are referenced in the metadata file.

c. The metadata file includes metadata to uniquely identify the asset, as well as declare its configurations and dependencies.

d. If the asset has source code, there is a source configuration named, for instance, "src". The archive (e.g., asset-src.Jar) contains the source of the asset and its user defined metadata.

e. An asset may also have multiple architecture-specific configurations, each named [architecture] with an [architecture].jar configuration, where architecture=processor_operating system_operating system-release, as an example. The JAR contains the binaries for the given architecture.

f. An asset may have dependencies that relate specifically to the source architecture, specifically to a given hardware architecture, or to all architectures. As such, the dependency graph may differ for different architectures.

g. An asset may be automatically tagged with architecture-specific names, as appropriate.

To share the deployable assets with other machines, a dependency manager 316b uploads the deployable assets to a remote repository 340 coupled to developer environment 300, as well as target runtime environment 350. The remote repository can be implemented as a webserver, source control system, a shared file system, or as a location on a shared file system, etc., as examples.

In the runtime environment, a dependency manager 354 downloads the asset from remote repository 340 and resolves the dependencies of the asset. If the asset or a dependency of the asset does not have a binary configuration for the architecture of the runtime environment, an asset retargeter 356, is invoked. It downloads any source configurations for the asset or dependencies that are lacking binary configurations, and invokes the dependency manager to resolve the source configurations. Assuming success, the asset and its dependencies that are to be compiled are bound to the runtime environment using a compiler arguments binder 358. A compiler 360 then compiles the asset and its dependencies to transform the source to executable. The deployable assets that are ready for deployment on the runtime environment are stored in a local repository 380.

As shown, the runtime environment also includes a build manager 352 used to facilitate the retargeting process by enabling the steps to be automatically invoked.

Further details regarding automatically building and packaging an asset; automatically uploading the asset; and automatically retargeting the asset are described with reference to FIGS. 4A-6.

Figure 4A:
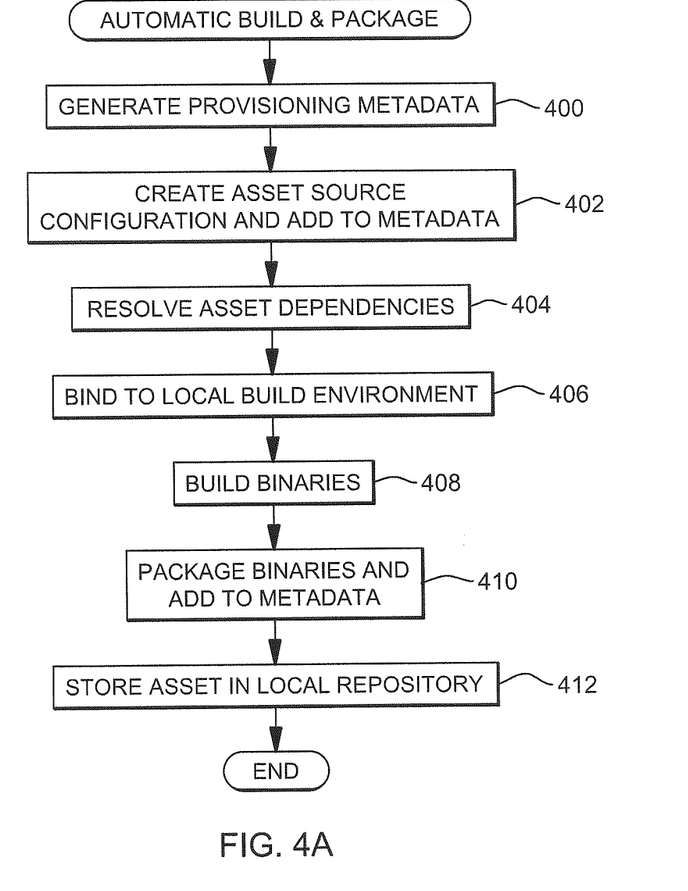
FIG. 4A depicts one embodiment of the logic to automatically build and package an asset, in accordance with an aspect of the present invention.

Referring initially to FIG. 4A, one embodiment of the logic to automatically build and package an asset is described. In one example, this logic is performed on a processor of the developer environment. First, for the asset being built, provisioning metadata is generated by, for instance, the dependency metadata generator, STEP 400. In particular, the dependency metadata generator takes the user-defined data and transforms it into a form usable by the dependency manager. It recursively generates provisioning metadata for the asset and any of its dependencies in the developer's workspace. For example, it takes the user-defined metadata specified in, for instance, pair values, and creates therefrom asset models for the asset and its dependencies. In particular, an asset model is defined for each asset, and it includes metadata that defines certain characteristics of the asset including, but not limited to, a name of the asset, architectural dependencies (e.g., operating system, hardware platform, etc.) of the asset, a version of the architectural dependencies, as well as dependencies, if any, on other assets. This information is captured in an XML-file (or other type of structured representation). As an example, assume an asset is Component A (see, e.g., FIG. 4B), and Component A depends on Library B, which depends on Resources C and D. The dependency metadata generator obtains the metadata for Component A, Library B and Resources C and D and creates the asset models for these assets.

Although various attributes of the asset are provided herein, these are only examples. Additional, fewer or different attributes can be incorporated and employed without departing from one or more aspects of the present invention.

Thereafter, a source configuration is created for the asset and added to the metadata, STEP 402. For example, the asset packager creates an asset_src.jar for each asset for which provisioning metadata was generated in source form, and adds the source configuration (asset_src.jar) to the asset's provisioning metadata.

Figure 4B:
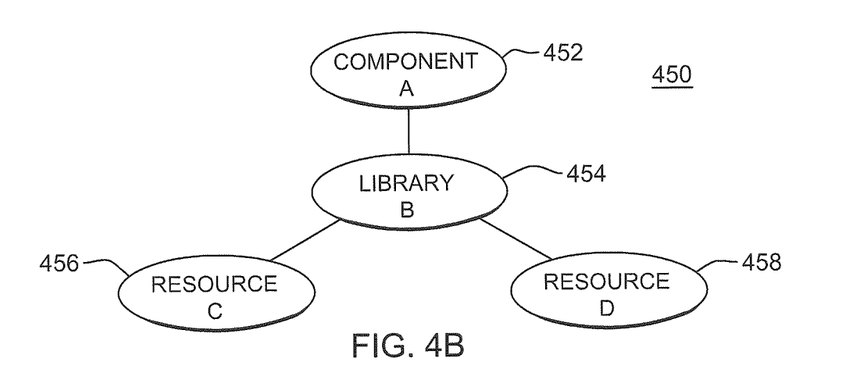
FIG. 4B depicts one example of a dependency graph, in accordance with an aspect of the present invention.

Subsequently, the asset is resolved to determine if all of its dependencies are available, STEP 404. In one example, the dependency manager resolves the entire dependency graph for the asset using, for instance, Apache IVY. As depicted in FIG. 4B for the example above, a dependency graph 450 includes a source vertex 452 representing Component A, a first child node 454 for Library B, and children nodes 456, 458 for Resources C and D. The one or more source vertices may include the metadata for the asset. Dependencies may be found in the developer workspace, local repository or remote repositories. Dependencies found, but not present in the local repository, are copied to the local repository.

Returning to FIG. 4A, for each asset in the local repository that is to be compiled, the compiler arguments binder binds its template definition (e.g., pkgconf file) of the compiler arguments to the local build environment, STEP 406.

Subsequently, the compiler builds binaries of the assets and its dependencies that are in the developer workspace, STEP 408. These binaries are then packaged and added to the metadata, STEP 410. For example, the asset packager packages the compiled binaries in, for instance, JAR files, and adds the architecture configuration (bin) to the provisioning metadata. Thereafter, each complete asset is stored in the local repository, STEP 412.

Figure 5:
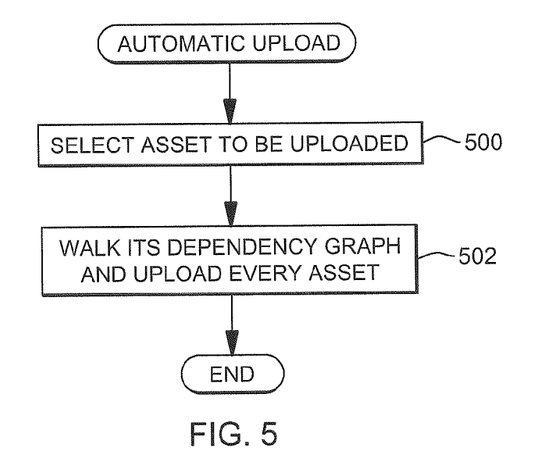
FIG. 5 depicts one embodiment of the logic to upload a packaged asset to a remote repository, in accordance with an aspect of the present invention.

Further details regarding the logic to upload an asset to a remote repository is described with reference to FIG. 5. Initially, the dependency manager selects an asset to be uploaded, STEP 500. Then, starting from the asset being uploaded, the dependency manager walks that asset's dependency graph and uploads every asset (provisioning metadata and multiple JAR files) from the local repository to the remote repository, STEP 502.

The remote repository is a shared repository allowing other users on different machines to download and rebuild, if necessary, the asset for use on another machine. One embodiment of the logic to automatically retarget an asset for another architecture is described with reference to FIG. 6. Retargeting is, for instance, the process of downloading the configuration of the desired asset specific to the target architecture, and if there is no such configuration, building one from the asset's source code. In one example, a processor within the runtime environment is performing this logic.

Figure 6:
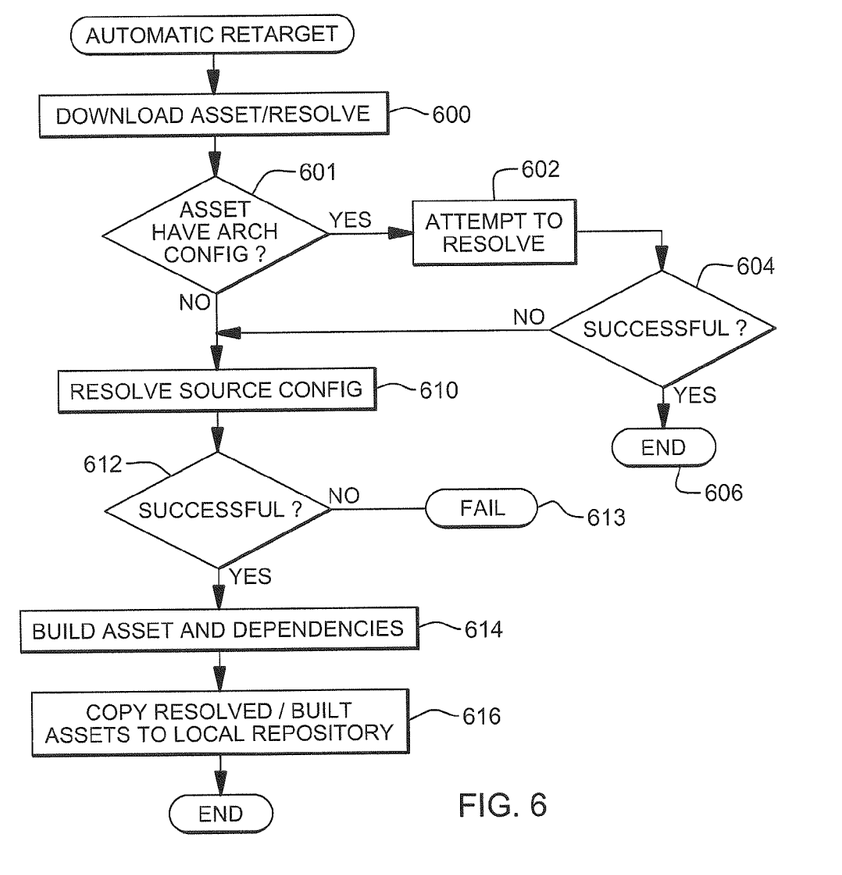
FIG. 6 depicts one embodiment of the logic to retarget the uploaded asset, in accordance with an aspect of the present invention.

Referring to FIG. 6, in one example, the asset is downloaded from the remote repository and the dependency manager initiates a resolve of that asset on the runtime environment, STEP 600. In doing the resolve a check is made to see if the asset has an [architecture] configuration, where architecture=the architecture (e.g., processor_operating system_operating system-release) of the runtime environment, stored within the local repository of the runtime environment, INQUIRY 601. If so, then an attempt is made to resolve the [architecture] configuration, STEP 602. In particular, in one example, the dependency manager is used to attempt to resolve the [architecture] configuration to determine if all the dependencies of the asset are available in [architecture] configuration.

If the asset and all nodes in its dependency graph have [architecture] configurations, the resolve succeeds. If the resolve is successful, INQUIRY 604, then processing is complete, STEP 606. However, if the resolve of the [architecture] configuration failed or if the asset did not have an [architecture] configuration, an architecture-specific rebuild is needed.

Thus, the asset retargeter attempts to download the source configurations for the asset or any of its dependencies lacking a binary configuration compatible with the target runtime, and invokes the dependency manager to resolve the source configurations, STEP 610. If the resolve fails (e.g., no source available for one or more of the assets), INQUIRY 612, then the retargeting fails, STEP 613. However, if the resolve succeeds, then in one example, the compiler arguments binder and the compiler are invoked to build the asset and its dependencies providing binary [architecture] configurations, STEP 614. The resolved/built assets are then copied to the local repository in the runtime environment, STEP 616. This ends the retargeting process.

In accordance with an aspect of the present invention, there are possible optional optimizations for the retargeting. For example, build can be minimized when resolving the source configuration. For instance, for every node in the graph, the [architecture] is downloaded, rather than the source configuration, if it exists. This may also allow resolves of the source configuration that would have otherwise failed to succeed, if there is a node in the dependency graph that has an [architecture] configuration, but not a source configuration.

As a further optimization in the build, attempt to resolve the [architecture] configuration for sub-graphs, when an internal vertex of the graph has an [architecture] configuration, such that the entire sub-graph does not have to be rebuilt.

An example of another optimization for the retargeting is that when resolving the [architecture] configuration dependency graph and one node of the graph has a dependency whose target does not specify an [architecture] configuration, resolve the source configuration dependency sub-graph rooted in that target and retarget that sub-graph, but continue to resolve the [architecture] configuration in the rest of the parent graph.

Figure 7:
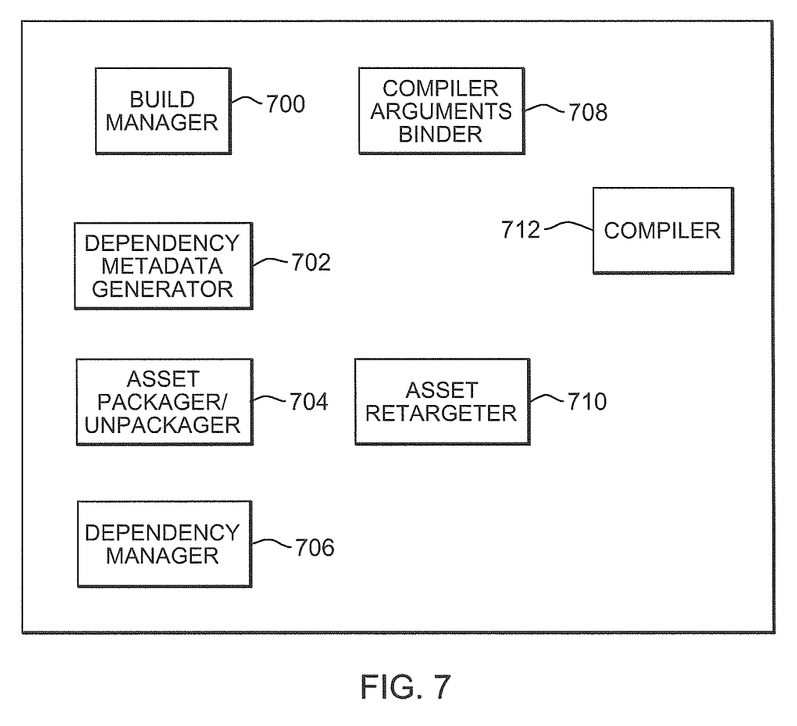
FIG. 7 depicts one embodiment of the various tools used to automatically build and retarget an asset, in accordance with an aspect of the present invention.

As described above, various tools are used in the automatic building and retargeting of an asset. A summary of these tools is described with reference to FIG. 7. In one example, these tools include:

a. Build Manager 700—This tool allows developers to specify the steps to be taken to transform an asset from source to executable.
b. Dependency Metadata Generator 702—Given the user-defined metadata present in a user created asset, and (if needed) further metadata retrieved by the build manager, the dependency metadata generator creates the provisioning metadata of an asset, and recursively the provisioning metadata of all its dependencies that are present in the developer workspace.
c. Asset Packager/Unpackager 704—This tool packages an asset's source and binary artifacts, found in the developer workspace, into an archive, such as JAR or ZIP files; and unpacks a retrieved asset in the local repository and invokes the compiler arguments binder.
d. Dependency Manager 706—Given a specification of the architecture configurations and dependencies of an asset, it resolves and downloads, if needed, the dependencies of the asset; and uploads the asset and its dependencies.
e. Compiler Arguments Binder 708—Given a template definition of the compiler arguments and build files of an asset, it binds the definition to the local build environment; and generates a list of bound assets, such that the compiler can build them without requiring the developer to specify the build process.
f. Asset Retargeter 710—Given an asset either whose binary was built for an environment other than a given target runtime environment or which does not have a binary, it obtains the source of the asset and, as needed, its dependencies, for a target runtime environment.
g. Compiler 712—Transforms source artifacts to executable artifacts.

Described in detail above is a capability for automatically building and retargeting an architecture-dependent asset. The architecture-dependent asset is retargeted on an architecture different from which the asset was built. This automatic building and retargeting may be performed on demand, at runtime.

In accordance with one or more aspects of the present invention, tools and workflows are provided that enable an automated declare-resolve approach to the building of an asset. In particular, workflows and tools are provided that allow:
  Metadata and dependencies to be declared about an asset;
  Resolve an asset to see if all dependencies are available;
  Build and package an asset for reuse;
  Upload an asset and its dependencies to a shared repository; and
  Download and retarget an asset to a given architecture.

To accomplish the automatic building and/or retargeting, the following are employed, as examples:
  Cross-compilation of user-defined metadata into metadata consumable by a dependency manager;
  A mechanism to bind template compiler options/parameters to a specific architecture; and
  A configuration detection and labeling mechanism to facilitate retargeting.

Further, the following are used, in one example:
  A build manager;
  A dependency manager that facilitates locating and downloading dependencies from a user-defined chain of repositories (e.g., IVY);
  A mechanism to retrieve compile options/parameters required to build architecture-dependent packages on a given machine (e.g., pkg-config); and
  User-supplied metadata.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
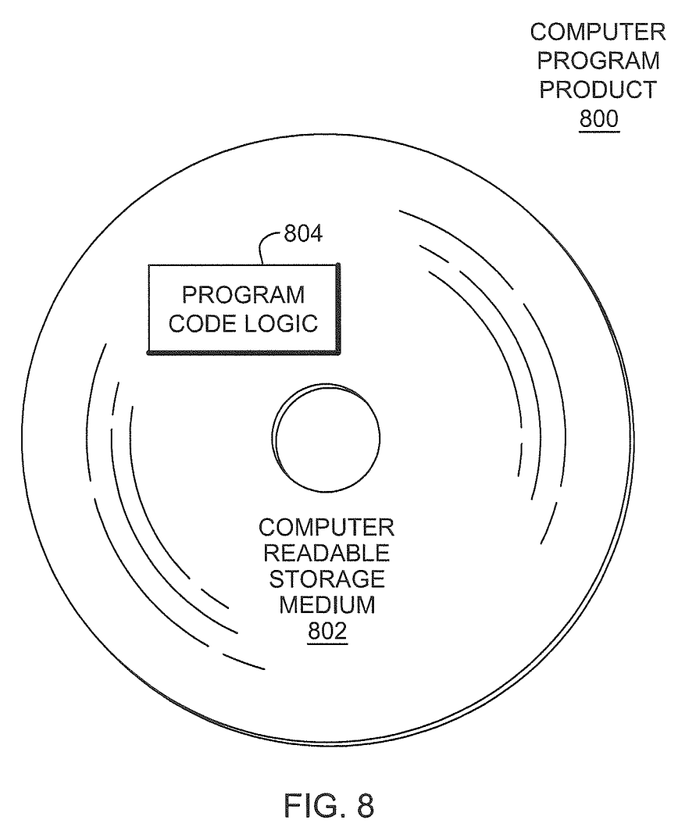
FIG. 8 depicts one embodiment of a computer program product incorporating one or more aspects of the present invention.

Referring now to FIG. 8, in one example, a computer program product 800 includes, for instance, one or more computer readable storage media 802 to store computer readable program code means or logic 804 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, other architectures and/or other characteristics of architectures can be used without departing from the spirit of the present invention. Further, additional, fewer or different tools may be used. Other types of assets can also be automatically built and/or retargeted. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating processing within a computing environment, said method comprising:
obtaining, by a processor, an architecture-dependent asset built for a first architecture, the architecture-dependent asset comprising at least one binary generated from compiling a source configuration, the at least one binary able to execute on the first architecture and unable to execute on a second architecture, which is different from the first architecture, absent retargeting of the architecture-dependent asset for the second architecture; and
automatically retargeting, by the processor, the architecture-dependent asset for the second architecture, the retargeting facilitating execution of the architecture-dependent asset on the second architecture and the retargeting comprising:
determining whether one or more dependency assets on which the architecture-dependent asset is dependent are able to execute on the second architecture, the determining comprising checking metadata for the architecture-dependent asset, the metadata identifying the one or more dependencies of the architecture-dependent asset; and
performing processing based on the at least one binary being unable to execute on the second architecture, and based on the determining whether the one or more dependency assets are able to execute on the second architecture, wherein performing the processing comprises compiling the source configuration into at least one binary executable on the second architecture.

2. The method of claim 1, wherein the first architecture is different from the second architecture in that it has at least one of a different hardware architecture, a different level of a hardware architecture, a different operating system, a different version of an operating system, or a different version of a software library than the second architecture.

3. The method of clam 1, wherein the architecture-dependent asset or a dependency thereof includes the source configuration and the at least one binary generated from compiling the source configuration, and able to execute on the first architecture, and wherein the automatically retargeting further comprises:
  determining that the at least one binary able to execute on the first architecture is unable to execute on the second architecture; and
  generating the at least one binary executable on the second architecture, in response to determining that the at least one binary able to execute on the first architecture is unable to execute on the second architecture.

4. The method of claim 3, wherein generating the at least one binary executable on the second architecture comprises:
  obtaining the source configuration; and
  performing the compiling of the source configuration, for the second architecture, into the at least one binary executable on the second architecture.

5. The method of claim 4, wherein generating the at least one binary executable on the second architecture further comprises:
  determining whether the source configuration is available;
  obtaining the source configuration, in response to determining the source configuration is available; and
  unsuccessfully terminating the generating, in response to determining the source configuration is unavailable.

6. The method of claim 3, wherein the retargeting further comprises:
  determining whether a binary for the obtained architecture-dependent asset or a dependency of the obtained architecture-dependent asset exists which is executable on the second architecture; and
  in response to determining that a binary for the obtained architecture-dependent asset or the dependency of the obtained architecture-dependent asset exists which is executable on the second architecture, selecting that binary from one or more binaries generated for the obtained architecture-dependent asset or the dependency of the obtained architecture-dependent asset.

7. The method of claim 1, wherein determining whether one or more dependency assets on which the architecture-dependent asset is dependent are able to execute on the second architecture comprises obtaining the metadata for the architecture-dependent asset, the metadata further identifying the architecture-dependent asset, and one or more configurations of the architecture-dependent asset, and wherein the obtained metadata is checked as part of the determining whether one or more dependency assets on which the architecture-dependent asset is dependent are able to execute on the second architecture.

8. The method of claim 7, wherein obtaining the metadata comprises:
  obtaining user-defined metadata for the architecture-dependent asset, said user-defined metadata in a form unusable to resolve dependencies of the architecture-dependent asset; and
  automatically generating from the user-defined metadata, metadata usable in resolving dependencies of the architecture-dependent asset.

9. The method of claim 1, further comprising:
  creating the architecture-dependent asset on a processor having the first architecture;
  resolving the architecture-dependent asset on the processor having the first architecture; and
  building the architecture-dependent asset on the processor having the first architecture to provide the architecture-dependent asset built for the first architecture.

10. The method of claim 9, further comprising storing the built architecture-dependent asset on a repository remote to the processor having the first architecture and remote to the processor performing the automatically retargeting.

11. The method of claim 10, wherein obtaining the architecture-dependent asset comprises downloading the built architecture-dependent asset from the remote repository to the processor performing the retargeting.

12. The method of claim 1, wherein the determining determines that a dependency asset on which the architecture-dependent asset is dependent is unable to execute on the second architecture and therefore is to be retargeted for the second architecture, and wherein the performing processing comprises automatically initiating retargeting of the dependency asset for the second architecture.

13. A computer program product for facilitating processing within a computing environment, the computer program product comprising:
  a non-transitory computer readable storage medium readable by a processor and storing instructions for execution by the processor for performing a method comprising:
    obtaining an architecture-dependent asset built for a first architecture, the architecture-dependent asset comprising at least one binary generated from compiling a source configuration, the at least one binary able to execute on the first architecture and unable to execute on a second architecture, which is different from the first architecture, absent retargeting of the architecture-dependent asset for the second architecture; and
    automatically retargeting the architecture-dependent asset for the second architecture, the retargeting facilitating execution of the architecture-dependent asset on the second architecture and the retargeting comprising:
      determining whether one or more dependency assets are able to execute on the second architecture; and
      performing processing based on the at least one binary being unable to execute on the second architecture, and based on the determining whether the one or more dependency assets are able to execute on the second architecture, wherein performing the processing comprises compiling the source configuration into at least one binary executable on the second architecture.

14. The computer program product of clam 13, wherein the architecture-dependent asset or a dependency thereof includes the source configuration and the at least one binary, generated from compiling the source configuration, and able to execute on the first architecture, and wherein the automatically retargeting further comprises:
  determining that the at least one binary able to execute on the first architecture in unable to execute on the second architecture; and
  generating the at least one binary executable on the second architecture, in response to determining that the at least one binary able to execute on the first architecture is unable to execute on the second architecture.

15. The computer program product of claim 14, wherein generating the at least one binary executable on the second architecture comprises:
  obtaining the source configuration; and performing the compiling of the source configuration, for the second architecture, into the at least one binary executable on the second architecture.

16. The computer program product of claim 13, wherein the method further comprises:
creating the architecture-dependent asset on a processor having the first architecture;
resolving the architecture-dependent asset on the processor having the first architecture; and
building the architecture-dependent asset on the processor having the first architecture to provide the architecture-dependent asset built for the first architecture.

17. The computer program product of claim 16, wherein the method further comprises storing the built architecture-dependent asset on a repository remote to the processor having the first architecture and remote to a processor performing the automatically retargeting.

18. The computer program product of claim 17, wherein obtaining the architecture-dependent asset comprises downloading the built architecture-dependent asset from the remote repository to the processor performing the retargeting.

19. A computer system for facilitating processing within a computing environment, the computer system comprising:
a memory; and
a processor in communications with the memory, wherein the computer system is capable of performing a method, said method comprising:
obtaining an architecture-dependent asset built for a first architecture, the architecture-dependent asset comprising at least one binary generated from compiling a source configuration, the at least one binary able to execute on the first architecture and unable to execute on a second architecture, which is different from the first architecture, absent retargeting of the architecture-dependent asset for the second architecture; and
automatically retargeting the architecture-dependent asset for the second architecture, the retargeting facilitating execution of the architecture-dependent asset on the second architecture and the retargeting comprising:
determining whether one or more dependency assets on which the architecture-dependent asset is dependent are able to execute on the second architecture; and
performing processing based on the at least one binary being unable to execute on the second architecture, and based on the determining whether the one or more architecture-dependent assets are able to execute on the second architecture, wherein performing the processing comprises compiling the source configuration into at least one binary executable on the second architecture.

20. The computer system of clam 19, wherein the architecture-dependent asset or a dependency thereof includes the source configuration and the at least one binary, generated from compiling the source configuration, and able to execute on the first architecture, and wherein the automatically retargeting further comprises:

determining that the at least one binary specific to the first architecture is unable to execute on the second architecture; and
generating the at least one binary executable on the second architecture, in response to determining that the at least one binary able to execute on the first architecture is unable to execute on the second architecture.

21. The computer system of claim 20, wherein generating the at least one binary executable on the second architecture comprises:
obtaining the source configuration; and
performing the compiling of the source configuration, for the second architecture, into the at least one binary executable on the second architecture.

22. The computer system of claim 19, wherein the method further comprises:
creating the architecture-dependent asset on a processor having the first architecture;
resolving the architecture-dependent asset on the processor having the first architecture; and
building the architecture-dependent asset on the processor having the first architecture to provide the architecture-dependent asset built for the first architecture.

23. The computer system of claim 22, wherein the method further comprises storing the built architecture-dependent asset on a repository remote to the processor having the first architecture and remote to a processor performing the automatically retargeting, and wherein obtaining the architecture-dependent asset comprises downloading the built architecture asset from the remote repository to the processor performing the retargeting.

24. A method of deploying logic on one or more processors to facilitate processing, said method comprising:
installing logic on at least one processor, the logic to:
obtain an architecture-dependent asset built for a first architecture, the architecture-dependent asset comprising at least one binary generated from compiling a source configuration, the at least one binary able to execute on the first architecture and unable to execute on a second architecture, which is different from the first architecture, absent retargeting of the architecture-dependent asset for the second architecture; and
automatically retarget the architecture-dependent asset for the second architecture, the retargeting facilitating execution of the architecture-dependent asset on the second architecture and the retargeting comprising:
determining whether one or more dependency assets on which the architecture-dependent asset is dependent are able to execute on the second architecture; and
performing processing based on the at least one binary being unable to execute on the second architecture, and based on the determining whether the one or more dependency assets are able to execute on the second architecture, wherein performing the processing comprises compiling the source configuration into at least one binary executable on the second architecture.

* * * * *